J. KARTHEISER.
CAR DOOR.
APPLICATION FILED NOV. 14, 1913.
1,113,352.
Patented Oct. 13, 1914.
2 SHEETS—SHEET 1.
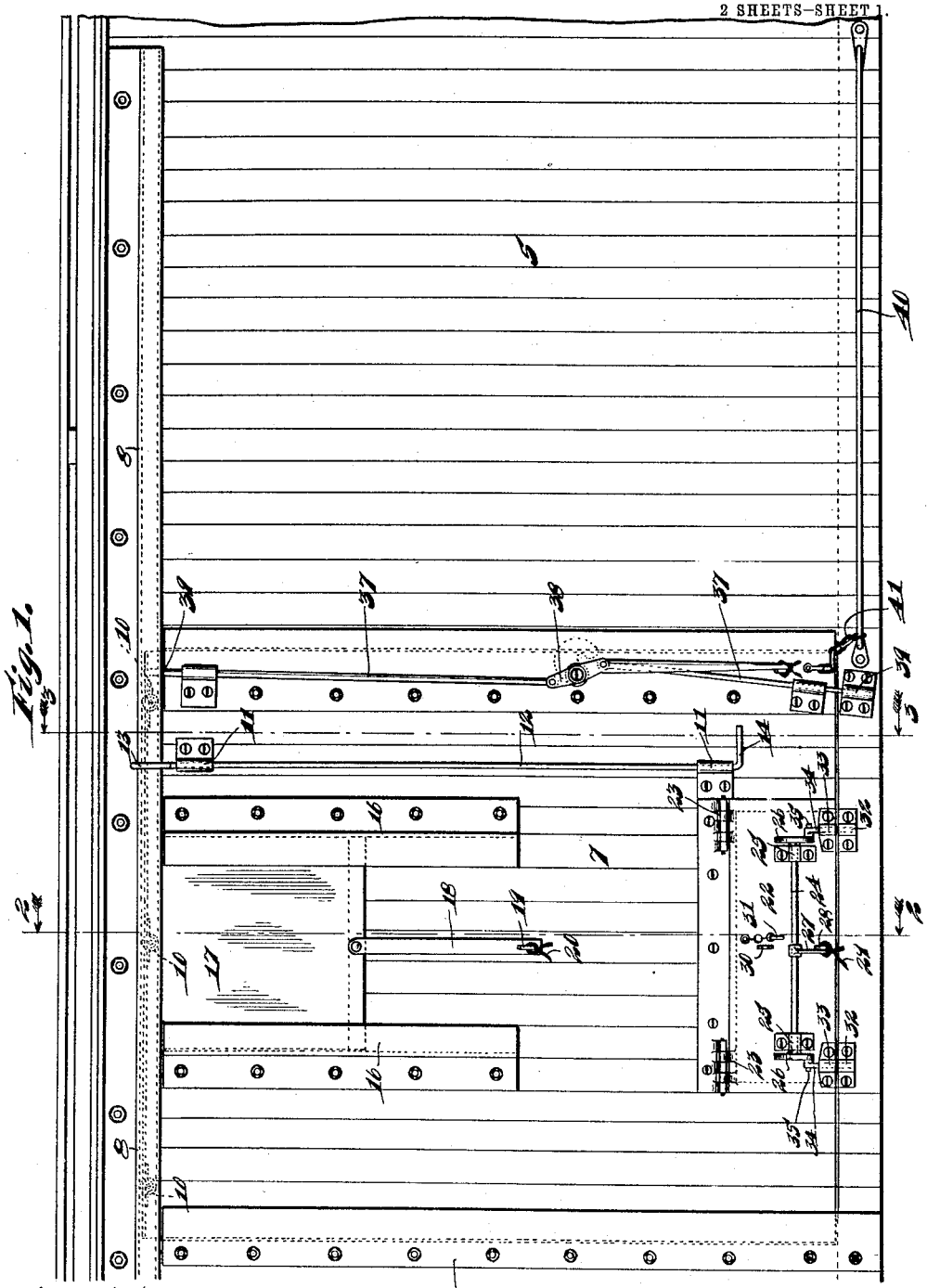
Witnesses:
C. E. Vessels
T. Colson.
Inventor:
John Kartheiser,
By Joshua R. H. Potts
his Attorney.

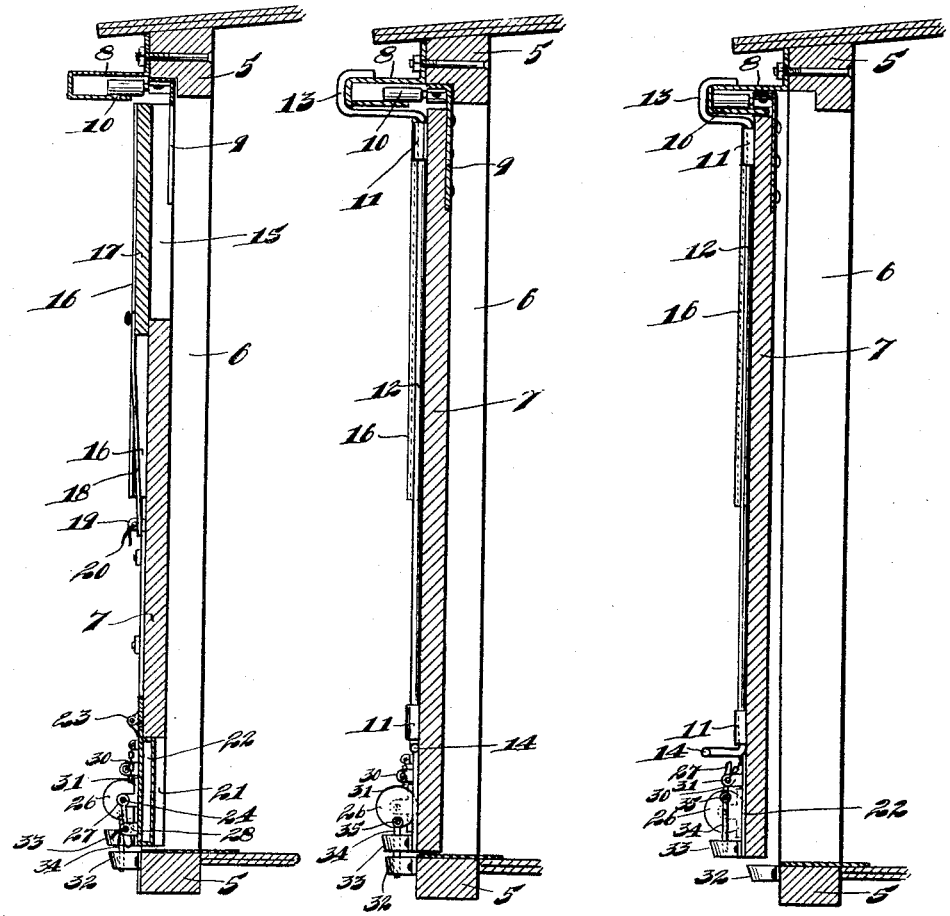

UNITED STATES PATENT OFFICE.

JOHN KARTHEISER, OF AURORA, ILLINOIS, ASSIGNOR OF ONE-HALF TO NICHOLAS KARTHEISER, OF AURORA, ILLINOIS.

CAR-DOOR.

1,113,352. Specification of Letters Patent. Patented Oct. 13, 1914.

Application filed November 14, 1913. Serial No. 800,946.

*To all whom it may concern:*

Be it known that I, JOHN KARTHEISER, a citizen of the United States, and a resident of the city of Aurora, county of Kane, and State of Illinois, have invented certain new and useful Improvements in Car-Doors, of which the following is a specification.

My invention relates to car doors, and the object of this improvement is the production of a simple and effective car door which will close the car door opening of a car and be flush with the outside of the car when closed.

A further object is the provision of a hanger for the car door which will permit outward movement of the door in order to permit the door to slide longitudinally of the car and uncover the door opening.

A still further object is the provision of smaller doors in the car door. Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a fragmentary elevation of a car equipped with my improvement, Fig. 2 is a section of the same taken on line 2—2 in Fig. 1, Fig. 3 is a similar view taken on line 3—3 in Fig. 1, and Fig. 4 is a section taken at the same position as indicated in Fig. 3 but having the door moved outwardly ready to be moved to open position.

The preferred form of construction as illustrated in the drawings, comprises a car 5 having a door opening 6 and a door 7 fitted in the door opening with its outer side coplanar with the outside of the car. At the upper edge of door opening 6 is a track 8 substantially U-shaped in cross section, the lower edge of said track 8 being cut away to permit lateral movement of the door 7 in order to allow the door 7 to be moved longitudinally of the car to open the same. On the inner side of door 7 is secured a hanger 9. On the outer edge of the hanger 9 are journaled rollers 10, the rollers 10 being adapted to ride on the lower leg portion of the track 8. The rollers 10 are of such a width as to permit sliding endwise in order to permit the door 7 to be moved from the position indicated in Fig. 3, to the position indicated in Fig. 4, in order to clear the side of the car when moved on track 8.

Rotatably mounted in bearings on the outside of door 7 is a rod 12 having at its upper end a bent lever portion 13 engaging the bight portion of track 8. At the lower end of rod 12 is a hand operable lever 14 by means of which the rod 12 is rotated and lever member 13 engaged with the outer edge of track 8 to move the door 7 from its position indicated in Fig. 3, to that indicated in Fig. 4. In the upper portion of door 7 is provided a small opening 15 and at the vertical edges of the opening 15 are guides 16. Mounted in the guides 16 for vertical movement is a sliding door 17 held in closed position by means of a bar 18 and staple 19 over which the perforated end of bar 18 rests. The bar 18 is locked on staple 19 by means of a seal 20, or its equivalent.

At the lower edge of door 7 is an opening 21 having a door 22 hinged at the upper edge thereof, as at 23. On the outer side of door 22 is a shaft 24 journaled in bearings 25 and provided at its ends with crank wheels 26. At the center of shaft 24 is a lever 27 by means of which said shaft is rotated. When the lever 27 is pointed downwardly, its lower end is adapted to engage a perforated lug 28 and be locked thereto by means of a seal 29, or its equivalent. When the lever 27 is rocked upwardly, its upper perforated end is adapted to engage a lug 30. When in its upper position a key 31 is adapted to engage the perforated lug 30 and the perforation in lever 27 to lock the lever in its upper position.

At the lower edge of door opening 21 are catches 32 and on door 22 adjacent catches 32 are guides 33, and in the guides 33 are slidably mounted locking bolts 34, the latter being connected to the crank wheels by means of crank pins 35 so that in rocking the lever 27 to its lower position, the locking bolts 34 will be in engagement with catches 32 to lock the door 22 in closed position, and upon rocking the lever 27 to its upper position, the bolts 34 will be withdrawn from catches 32 unlocking the door 22.

At one edge of door opening 6 is secured a plate 36 which overlaps door 7 and serves as a lock therefor. At the other vertical edge of door 7 are mounted two locking bolts 37 which are pivoted to a lever 38 for simultaneous operation. The locking ends of bolts 37 engage catches 39 at the top and bottom of door 7 to lock said door in closed position.

At the lower edge of car 5 is a rod 40, and slidably mounted on the rod 40 is the lower end of a chain 41, the upper end of chain 41 being secured to door 7 and adapted to limit the outward movement of the bottom of door 7 during the longitudinal movement of said door in passing to its open position.

In operation, the door 7 is opened by manually moving lever 38 to withdraw bolts 37 from their catches. The lever 14 is then rocked to move lever 13 which is in engagement with the outer edges of track 8 to swing the corresponding vertical edge of door 7 laterally of the car to permit longitudinal movement of said door to open the same. The car door is then opened by manually moving the same longitudinally of the car. In closing the door the reverse order to that just mentioned is enacted.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a car having a door opening; a door in said door opening; a track substantially U-shaped in cross section on said car; a rigid hanger secured on said door and having a portion extending between the legs of said U-shaped track, said hanger being adapted to move laterally of said track to permit movement of said door laterally from said door opening; a rod rotatably mounted on said door, having its upper end bent forming a lever engaging the bight portion of said track and a portion resting on the upper side of said track preventing downward movement of the rod and its lower end bent forming an operating lever, substantially as described.

2. In combination, a car having a door opening; a door in said opening; a track substantially U-shaped in cross section disposed with its bight portion directed away from said door opening and its upper leg secured to said car above said door opening; hangers secured to said door and extending into said track and adapted to permit longitudinal and lateral movements of said door, said hangers being adapted to engage the lower leg of said track and limit the outward movement of said door; and a lever mounted on said door, engaging the bight portion of said track and adapted to move said door laterally, substantially as described.

In testimony whereof I have signed my name to this specification in the presence of two subscribing witnesses.

JOHN KARTHEISER.

Witnesses:
JOSHUA R. H. POTTS,
ARTHUR A. OLSON.

Copies of this patent may be obtained for five cents each, by addressing the "Commissioner of Patents, Washington, D. C."